(12) United States Patent
Boutaghou et al.

(10) Patent No.: US 6,296,552 B1
(45) Date of Patent: Oct. 2, 2001

(54) BURNISHING HEAD WITH FLY HEIGHT CONTROL SPACER

(75) Inventors: Zine-Eddine Boutaghou, St. Paul; Mark James Schaenzer, Eagan; William Omar Liners, Minnetonka; Joel William Hoehn, Cottage Gove, all of MN (US); Andreas Argyros Polycarpou, Champaign, IL (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/493,290

(22) Filed: Jan. 28, 2000

Related U.S. Application Data
(60) Provisional application No. 60/117,868, filed on Jan. 29, 1999.

(51) Int. Cl.[7] ..................................................... B24B 1/00
(52) U.S. Cl. ........................... 451/41; 451/317; 451/318; 451/290; 451/552; 451/63
(58) Field of Search ..................... 451/317, 318, 451/258, 246, 901, 183, 146, 552–557, 312, 324, 63

(56) References Cited

U.S. PATENT DOCUMENTS

| | | | |
|---|---|---|---|
| 3,486,274 | * 12/1969 | David | 451/317 |
| 4,845,816 | * 7/1989 | Nanis | 451/901 |
| 5,063,712 | * 11/1991 | Hamilton et al. | 451/317 |
| 5,782,680 | * 7/1998 | Pilsan | 451/63 |
| 5,980,369 | * 11/1999 | Burga et al. | 451/317 |

* cited by examiner

*Primary Examiner*—Joseph J. Hail, III
*Assistant Examiner*—Lee Wilson
(74) *Attorney, Agent, or Firm*—Brian D. Kaul

(57) ABSTRACT

A burnishing head configured to provide extremely close control of the burnishing height, to minimize stiction between the burnishing head and a disc being burnished, and to optimize the tribological relationship between the burnishing head and a disc being burnished. The burnishing head includes one or more spacer pads, associated with selected ones of the burnishing pads on the burnishing head, which remain in contact with the surface of a disc being burnished. The height from the contact surface of the spacer pad to the contact surface of the burnishing pad determines the effective burnishing height. The burnishing head also includes moats, or recessed areas, surrounding the burnishing pads to minimize the stiction caused by generation of a liquid meniscus between the disc and contacting elements of the burnishing head, and which act as collection points for particulates generated by the burnishing process. The spacer pads preferably include microtextured contact surfaces to minimize stiction and wear and further include a diamond-like carbon coating to further improve wear characteristics.

20 Claims, 12 Drawing Sheets

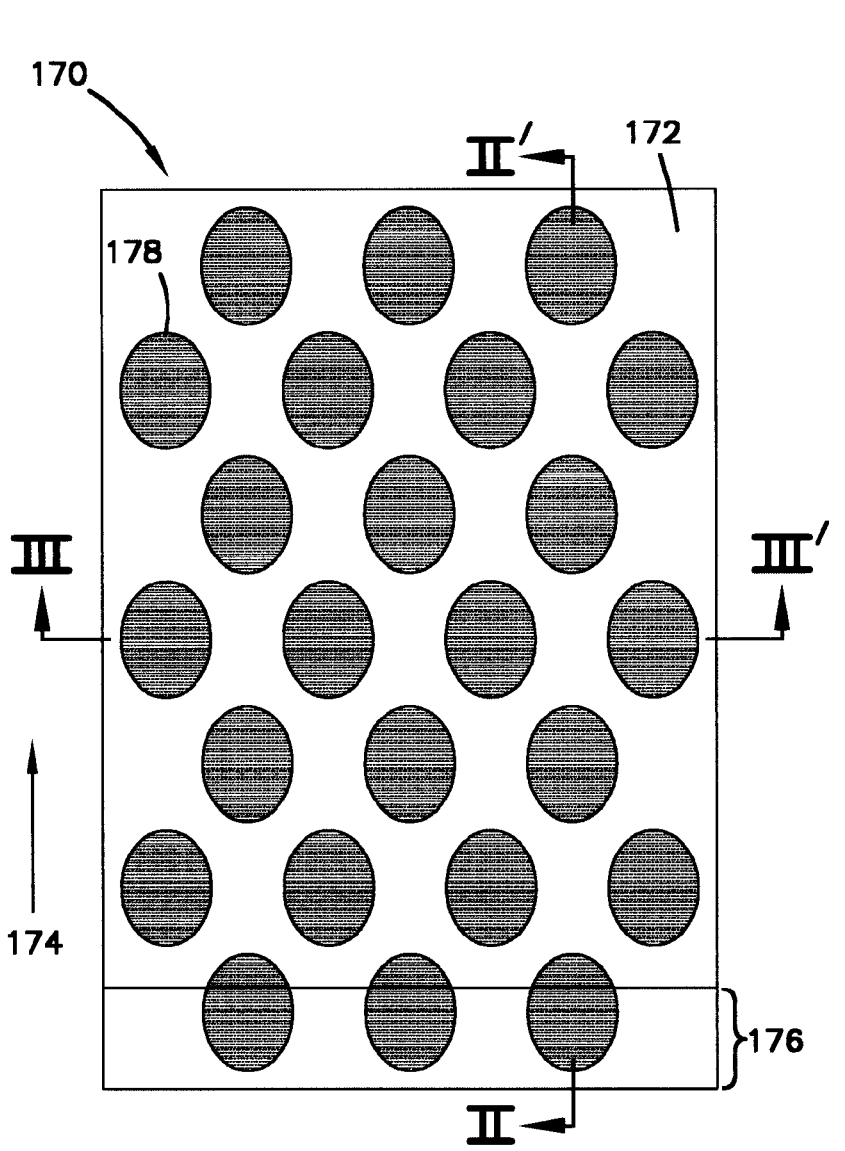
FIG. 4A
(Prior Art)
FIG. 4B
(Prior Art)
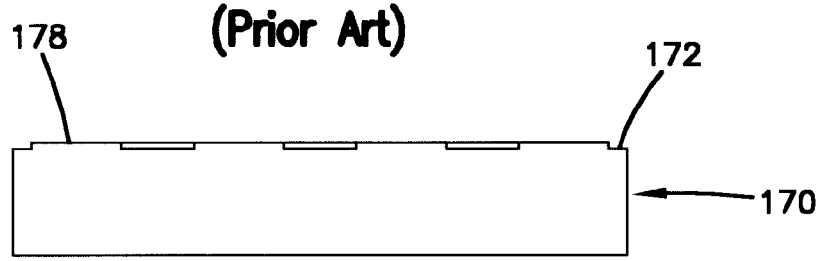
FIG. 4C
(Prior Art)

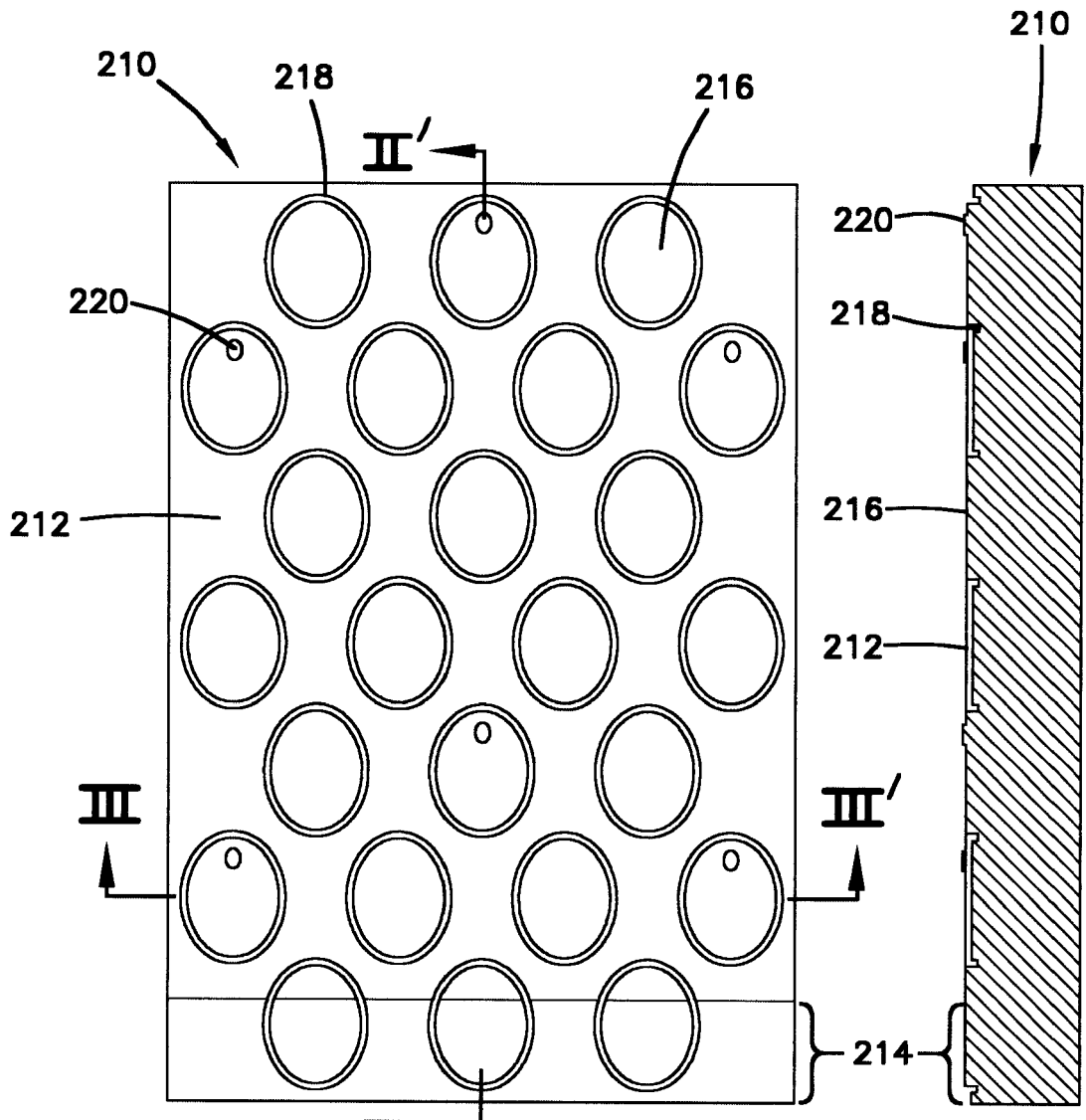
FIG. 7A
FIG. 7B
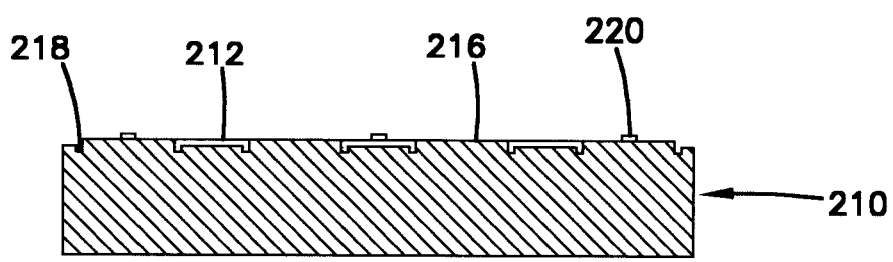
FIG. 7C

BURNISHING HEAD WITH FLY HEIGHT CONTROL SPACER

CROSS-REFERENCE TO RELATED APPLICATION

This Application claims the benefit of U.S. Provisional Application Serial No. 60/117,868, filed Jan. 29, 1999.

BACKGROUND OF THE INVENTION

This invention relates generally to the field of rigid disc drives, and more particularly, but not by way of limitation, to an improved burnish head, which can be utilized to facilitate manufacture of rigid magnetic recording media with extremely smooth surface characteristics.

Disc drives of the type known as "Winchester" disc drives or rigid disc drives are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼" format. Disc drives of the current generation typically have a data capacity of over a gigabyte (and frequently several gigabytes) in a 3½" package which is only one fourth the size of the full height, 5¼" format or less. Even smaller standard physical disc drive package formats, such as 2½" and 1.8", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction was needed to reduce the size of the individual bit domain and allow greater recording density.

Since the reduction in gap size also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a non-magnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, since the size of contemporary head gaps allowed data recording and retrieval with a head flying height of twelve microinches (0.000012 inches, $12\mu$") or greater, the surface characteristics of the discs were adequate for the times.

Disc drives of the current generation incorporate heads that fly at nominal heights of only about $1.0\mu$", and products currently under development will reduce this flying height to $0.5\mu$" or less. Obviously, with nominal flying heights in this range, the surface characteristics of the disc medium must be much more closely controlled than was the case only a short time ago.

In current disc drive manufacturing environments, it is common to subject each disc to component level testing before it is assembled into a disc drive. One type of disc test is referred to as a "glide" test, which is used as a go/no-go test for surface defects or asperities, or excessive surface roughness. A glide test typically employs a precision spin stand and a specially configured glide test head including a piezo-electric sensing element, usually comprised of lead-zirconium-titanate ($PbZrTi_3$), also commonly known as a "pzt glide test head". The glide test is performed with the pzt glide test head flown at approximately half the flying height at which the operational read/write head will fly in the finished disc drive product. For instance, if the disc being glide tested is intended for inclusion in a disc drive in which the operational heads will fly at $1.0\mu$", the glide test will typically be performed with the pzt glide test head flying at $0.5\mu$". If the glide test is completed without sensing any surface defects, then the disc is passed on the assumption that there will be no adverse effects on the operational heads and the discs during normal operation with a nominal head flying height twice that of the pzt glide test head flying height.

If, however, surface asperities or defects exist on the surface of the disc under test, the passage of the glide test head over the surface asperity will result in excitation of the glide test head, due to either direct contact between the pzt glide test head and the surface defect, or the disruption of the nominal hydrodynamic relationship between the rotating disc and the pzt test head. Current glide test head technology allows for the detection of media surface defects in the sub-microinch range.

When surface defects are detected on a disc, the disc is subjected to an additional manufacturing step called "burnishing". Burnishing is accomplished through the use of specially configured burnishing heads. The burnishing head is engaged with a rotating disc and contact between the burnishing head and surface defects results in mechanical removal of the surface defects. Following the burnishing process, the glide test is again performed. Current economic considerations dictate that any given disc will be subjected to the burnishing and glide test processes only a limited number of times, such as twice, before—with the continuing presence of surface defects—being finally rejected.

With the continuing trend in increased disc surface smoothness, the configuration of the burnishing head has undergone significant developmental changes, and, with the extremely smooth discs associated with current and future technology disc drives, two principal engineering challenges have arisen. Firstly, the burnishing height of the burnishing head must be more closely controlled, and secondly, the tribological interaction between the disc media and the burnishing head must be more closely controlled.

In order to properly burnish such a smooth surface, the slider of the burnish head must fly in close proximity to the disc surface and within an extremely close tolerance range. As the burnish head burnishes and smoothes the disc surface, both the media surface and the surface of the burnishing pads on the burnishing head approach and atomically smooth condition, and the interaction between two such surfaces results in increased static friction, or "stiction", due to adhesion. This condition can lead, in turn, to damage to the thin carbon overcoat layer on the disc surface, or even to scratching of the disc surface.

A need clearly exists, therefore, for a burnishing head configuration that performs burnishing to the sub-microinch level, which counteracts the tendency of extremely smooth surfaces to adhere to one another, and which optimizes the tribological relationships between the burnishing head and the discs being burnished.

SUMMARY OF THE INVENTION

The present invention is a burnishing head configured to provide extremely close control of the burnishing height, to minimize stiction between the burnishing head and a disc being burnished, and to optimize the tribological relationship between the burnishing head and a disc being burnished. The burnishing head includes one or more spacer pads, associated with selected ones of the burnishing pads on the burnishing head, which remain in contact with the surface of a disc being burnished. The height from the contact surface of the spacer pad to the contact surface of the burnishing pad thus determines the effective burnishing height. The burnishing head also includes moats, or recessed areas, surrounding the burnishing pads to minimize the stiction caused by generation of a liquid meniscus between the disc and contacting elements of the burnishing head, and which act as collection points for particulates generated by the burnishing process. The spacer pads are formed of a wear-resistant material, and preferably include microtextured contact surfaces to minimize stiction and wear and further include a diamond-like carbon coating to further improve wear characteristics.

The manner in which the present invention is implemented, as well as other features, benefits and advantages of the invention, can best be understood by a review of the following Detailed Description of the Invention, when read in conjunction with an examination of the accompanying drawings.

BRIEF DESCRIPTION OF THE DRAWINGS

FIG. 4A is a bottom plan view of a typical prior art burnishing head.

FIG. 4B is a sectional side elevation view of the prior art burnishing head of FIG. 4A, taken along the line II–II' of FIG. 4A.

FIG. 4C is a sectional and elevation view of the prior art burnishing head of FIG. 4A, taken along line III–III' of FIG. 4A.

FIG. 7A is a bottom plan view of a burnishing head made in accordance with the present invention.

FIG. 7B is a sectional side elevation view of the burnishing head of FIG. 7A, taken along line II–II' of FIG. 7A.

FIG. 7C is a sectional end elevation view of the burnishing head of FIG. 7A, taken along line III–III' of FIG. 7A.

DETAILED DESCRIPTION OF THE INVENTION

Figure 1:
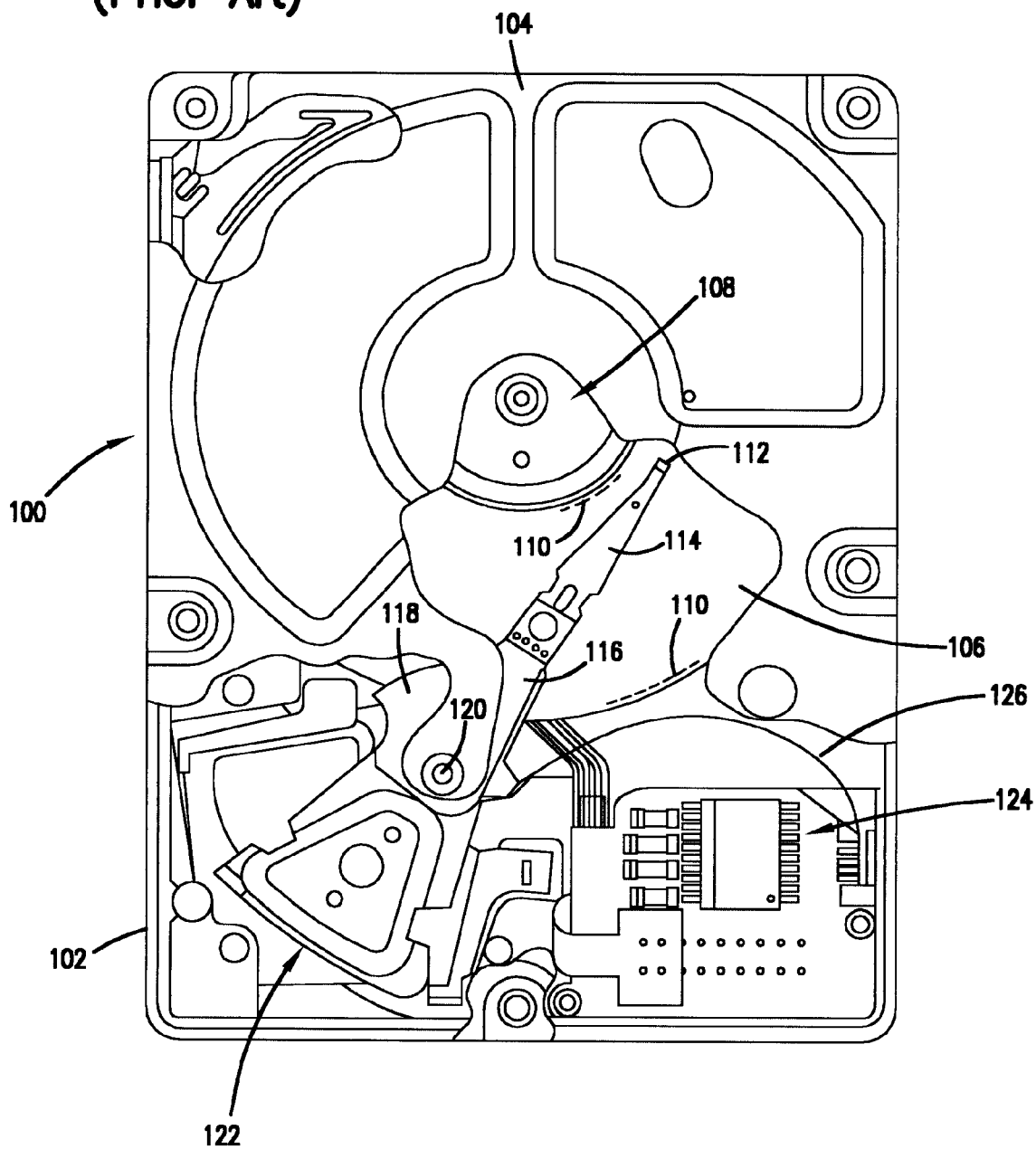
FIG. 1 is a plan view of a disc drive in which discs, which have been processed using the burnishing head of the present invention, are utilized.

Turning now to the drawings and specifically to FIG. 1, shown is a plan view of a disc drive 100 with which discs processed using the present invention are particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of precision ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

It will be apparent to one of skill in the art that the proper operation of the disc drive 100 will depend in large part on the existence of a controlled, precise relationship between the head assemblies 112 and the discs 106. Therefore, it is common in the industry to test each of the discs 106 included in the disc drive 100 before the discs 106 are assembled into the disc drive 100.

Figure 2:
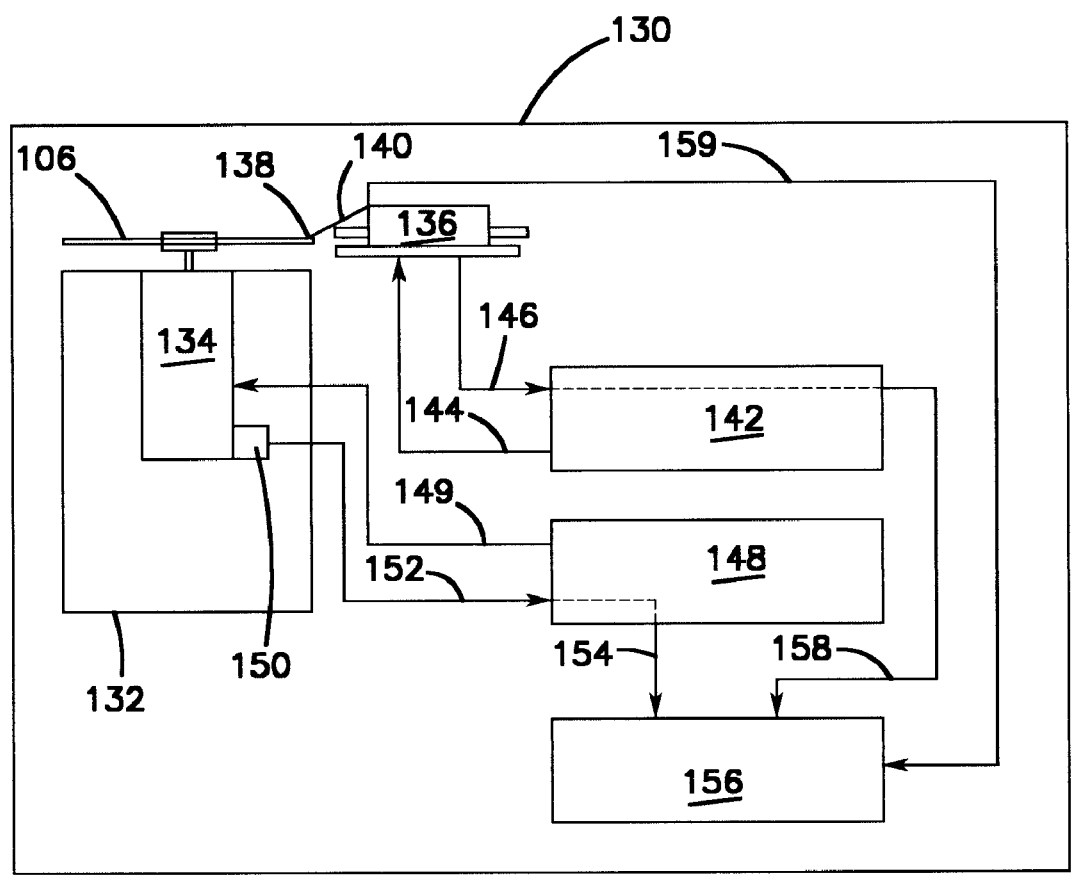
FIG. 2 is a simplified functional block diagram of a prior art test system in which the burnishing head of the present invention can be integrated.

FIG. 2 is a simplified functional block diagram of a typical prior art test unit 130 used to glide test and map the surface of recording discs as components before the discs are assembled into disc drive units. The test unit 130 can also incorporate the burnishing head of the present invention, should the burnishing process be required as a result of the glide test. The test unit 130 includes a precision spin stand 132 which further includes a spin motor 134 on which the disc 106 is mounted for rotation and testing.

The test unit 130 also typically includes a linear actuator 136 which is used to controllably move a test head 138, or a burnishing head, mounted on a head suspension 140, on a linear path across a radius of the disc 106. Actuator control logic 142 is also included in the test unit 130 and provides the control signals on signal path 144 needed to move the test head 138 and monitors, via signal path 146, the position of the test or burnishing head 138 during testing of the disc 106. In a typical test unit of the current art, the actuator supports and controls a second test or burnishing head for simultaneous testing or burnishing of the second disc surface. For purposes of clarity, the figure shows only a single test or burnishing head 138.

The test unit 130 also includes spin motor control logic 148 which is used to accelerate the spin motor 134 to its intended testing or burnishing speed by passing motor drive signals on path 149. It is common practice in the industry, during glide testing, to vary the speed of the spin motor 134 as the test head 138 is moved across the disc radius to provide a constant linear velocity between the test head 138 and the area of the disc being tested. That is, as the test head 138 is moved inward, the speed of the spin motor is increased proportionally to maintain a constant linear velocity, and thus maintain a constant flying height for the test head 138.

The spin stand 132 also includes a spin motor position encoder 150 which provides a position dependent reference signal. This reference signal is carried over signal path 152 to the spin motor control logic 148 where it is used to assist in the control of the speed of the spin motor 134. The reference signal is also passed via signal path 154 to defect mapping logic 156, where it is utilized, along with the actuator position signal passed via signal path 158 by the actuator control logic 142, to maintain a constant calculation of the radial and circumferential portion of the disc 106 that is located under the test head 138.

During the testing operation, a disc 106 is mounted on the spin motor 134 and the spin motor 134 is brought up to operational speed by the spin motor control logic 148. Once the spin motor 134 is at the proper speed, the actuator control logic 142 causes the actuator 136 to move the test head 138 into cooperative arrangement with the surface of the disc 106. The test head 138 is then stepped across the spinning disc 106 at a rate selected to cause the test head 138 to pass over every portion of the disc surface. As the head is stepped across the disc surface, the spin motor control logic 148 varies the spin motor speed to maintain a constant relative linear velocity between the test head 138 and the disc area being tested as noted above.

A defect on the disc surface will cause the test head 138 to generate a defect signal which is passed to the defect mapping logic 156 via signal path 159. Recognition of the defect signal by the defect mapping logic 156 results in the current radial and circumferential location of the test head 138 relative to the disc 106 being recorded. Once the test head 138 has passed over the entire usable radial extent of the disc 106, all detected and recorded defects are correlated to produce a defect map of the entire disc surface.

If the glide testing described above indicates that burnishing of the disc under test is advisable, the disc is typically moved to a similar test system which includes a burnishing head. The burnishing head is moved radially across the entire usable portion of the disc in a manner similar to that described above to mechanically remove any surface defects which would be expected to adversely effect the operation of the disc drive into which the disc will eventually be incorporated.

Test units of the type described above and which can be modified to include and implement the present invention are available from several sources. A typical test unit of this type is the model number MSA 450, manufactured by Cambrian Systems, Inc., a subsidiary of Phase Metrics Corporation, located in Westlake Village, Calif.

It is well known in the industry that, at the microscopic levels of surface texture associated with current technology discs and heads, slight increases in surface roughness provide corresponding reductions in stiction.

Figure 3:
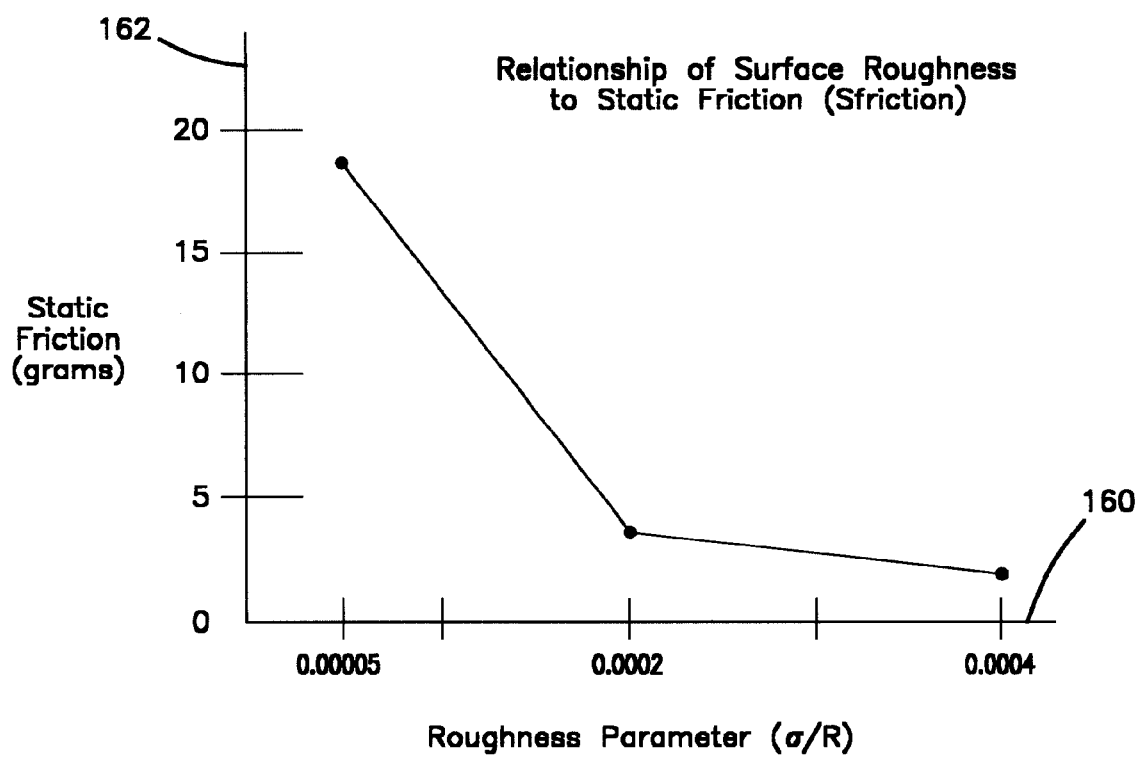
FIG. 3 is a graph representing the relationship between surface roughness and stiction.

FIG. 3 is a graphic representation of the relationship between an average roughness parameter and associated stiction. The roughness parameter is defined as $\sigma/R$, where:

$\sigma$=standard deviation of media surface defect heights, and

R average radius of curvature of the media surface defects.

On the horizontal axis of the figure, three particular surface roughness parameters have been plotted: 0.00005, 0.0002 and 0.0004. The vertical axis of FIG. 3 plots the associated stiction, measured in units of grams.

Current technology disc drive media is manufactured with a roughness parameter in the range of 0.00005, which, as can be seen in the graph of FIG. 3, results in large amounts of stiction if used in conjunction with a perfectly flat head slider surface.

As can be seen in the figure, as the roughness parameter increases, the associated stiction decreases. Knowledge of this relationship leads to one aspect of the presently preferred embodiment of the present invention, as will be discussed in detail hereinbelow.

FIGS. 4A, 4B and 4C are bottom plan, side sectional and end sectional views, respectively, of a typical prior art burnishing head 170, with the view of FIG. 4B being taken along axis II–II' of FIG. 4A, and the view of FIG. 4B being taken along axis III–III' of FIG. 4A. As can be seen in the figures, the burnishing head 170 includes a slider body (not separately designated) which includes an air bearing surface 172. The air bearing surface 172 interacts with a thin layer of air dragged along by the spinning disc to "fly" the burnishing head 170 in close proximity to the disc surface, all in a manner well known in the art.

The direction of disc rotation relative to the burnishing head 170 is shown by arrow 174, and thus the lower end of the burnishing head 170 in FIG. 4A is called the "leading edge", since it is the first portion of the burnishing head 170 under which any given portion of the disc passes. Near the leading edge of the burnishing head 170, the air bearing surface 172 can be seen to include a beveled portion 176, which aids in rapidly establishing the air bearing between the burnishing head 170 and the spinning disc.

The burnishing head 170 can also be seen to include a plurality of individual burnishing pads 178 which extend from the air bearing surface 172, as can most clearly be seen in the sectional views of FIGS. 4B and 4C. The burnishing pads 178 are arranged in an array such that lateral edges of the burnishing pads 178 overlap the lateral edges of burnishing pads 718 in adjacent rows across the width of the burnishing head 170. Thus, any surface defect in the disc which passes below the array of burnishing pads 178 must pass beneath one longitudinal column of burnishing pads 178. As the surface defects pass beneath the burnishing pads 178, and if the surface defect is of sufficient size to represent a potential problem for the operational head with which the disc being burnished is intended to function, the defect is mechanically abraded by contact with the burnishing pads 178 and reduced to a size which will not pose a potential risk of causing malfunction of the disc drive in which the disc is incorporated.

One drawback of the prior art burnishing head 170 of FIGS. 4A, 4B and 4C is that the precision with which the burnishing head 170 performs its function is dependent upon a number of factors. That is, the degree to which the burnishing head reduces the size of surface defects on a disc is dependent upon the actual flying height of the burnishing head 170 above the disc, and the flying height is, in turn, a function of both the configuration of the air bearing surface, including the effects induced by the presence of the extending burnishing pads 178 in the air stream passing beneath the burnishing head, and of the head suspension (140 in FIG. 2) used to mount and support the burnishing head 170.

As will be appreciated by one of skill in the art, the head suspension provides a load force which is exerted toward the disc surface, and which counterbalances the hydrodynamic lifting force exerted by the air bearing between the burnishing head and the disc surface. Since the hydrodynamic lifting force is inversely proportional to the separation between the burnishing head 170 and the disc surface, an equilibrium is established at a flying height at which the hydrodynamic lifting force is exactly equal to the load force exerted by the head suspension. However, as is also known to those of skill in the art, the load force exerted by the head suspension is typically controlled by a bend, or bends, introduced into the originally flat head suspension material, and is thus dependent upon many manufacturing and material variables. Thus, any variation in head suspension material or manufacture is reflected in a corresponding variation in the flying height of the burnishing head 170, and potentially unacceptable variation in the effectiveness of the burnishing head 170 in reducing disc surface defects to acceptable sizes.

Another factor which acts as a drawback to the use of prior art burnishing heads such as that shown in FIGS. 4A, 4B and 4C relates to stiction. One determinant known to contribute to stiction between heads and discs is the presence of an unavoidable amount of water vapor within the disc drive, and in testing and burnishing equipment used to process the discs that will be incorporated into disc drives, and the presence of a lubricant layer on the surface of the disc.

Figure 5A:
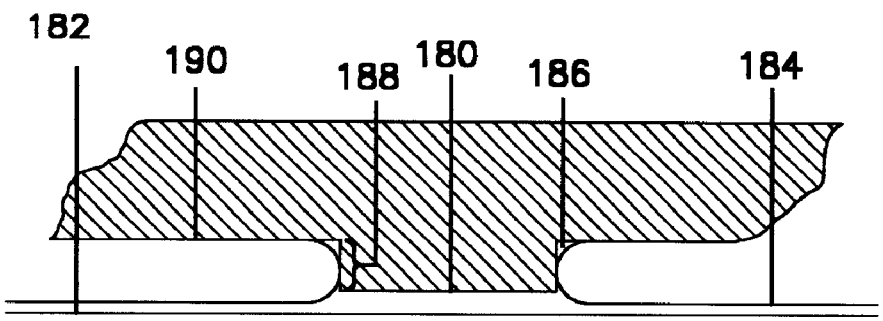
FIGS. 5a and 5B are a detail sectional elevation views of a burnishing pad of the prior art burnishing head of FIG. 4A, showing one condition leading to increased stiction with such a prior art burnishing head.

FIG. 5A shows a simplified detail elevation sectional view of a burnishing pad 180 incorporated in a prior art burnishing head, such as the burnishing head 170 of FIGS. 4A, 4B and 4C, as it interacts with the surface 182 of a disc.

As is known to those of skill in the art, the unavoidable presence of water vapor in the atmosphere and the presence of a lubricant on the disc results in a thin liquid layer 184 on the disc surface 182. In the area where the burnishing pad 180 lies close to the disc surface 182, a liquid meniscus 186 forms between the burnishing pad 180 and the disc surface 182. The liquid meniscus 186 acts to bind the burnishing head to the disc, and induces drag that contributes to stiction.

It is also known that the size, and therefore the strength, of the liquid meniscus 186 is an inverse function of the height 188 by which the burnishing pad 180 extends from the surrounding surface, in this case the air bearing surface 190. This deleterious effect on the head/disc interface is exacerbated when burnishing heads are fabricated which fly closer to the disc and which have burnishing pads that extend to lesser heights from the air bearing surface, as can be seen in FIG. 5B.

Figure 5B:
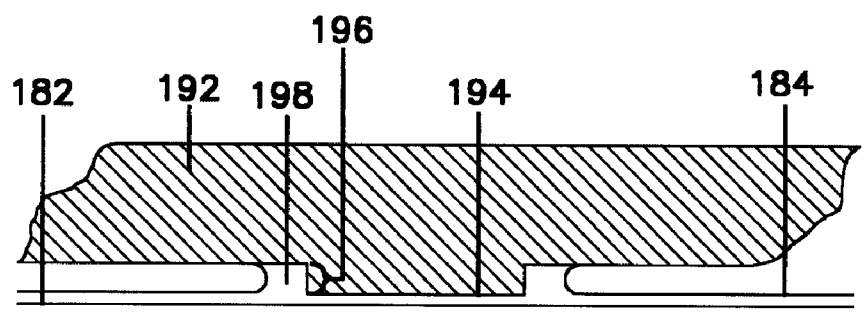

Comparing FIG. 5B to FIG. 5A, it is apparent that the burnishing head 192 of FIG. 5B is flying closer to the disc surface 182 than was the burnishing head of FIG. 5A, and that the lowermost surface of the burnishing pad 194 is in greater proximity to the disc surface 182 as well. This difference would be expected for a burnishing head intended to produce finished discs having a smoother average surface than the burnishing head shown in FIG. 5A.

Furthermore, it can be seen that the height 196 by which the burnishing pad 194 extends from the surrounding air bearing surface 197 is less than the corresponding dimension (188) in FIG. 5A.

The result of such dimensional modifications, intended to produce a prior art-type burnishing head capable of providing smoother recording media, is that the liquid meniscus 198 is increased in size and strength. That is, the liquid meniscus 198 now extends radially further from the burnishing pad 194, causing increased stiction, and reducing the functionality of the burnishing head 192.

A first aspect of the present invention is intended to overcome these drawbacks in prior art burnishing heads, and to allow for increased burnishing precision while at the same time reducing stiction as a result of the unavoidable presence of water vapor and lubricant at the head/disc interface.

Figure 6:
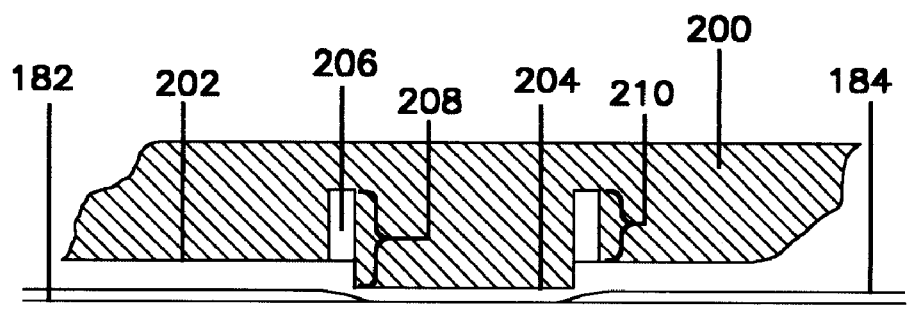
FIG. 6 is a detail sectional elevation view of a burnishing pad of a burnishing head made in accordance with the present invention, showing how one aspect of the present invention serves to minimize stiction.

Turning now to FIG. 6, shown is a simplified detail elevation sectional view, similar to those of FIGS. 5A and 5B, of a burnishing head 200 that has been modified in accordance with a first aspect of the present invention.

In FIG. 6, it can be seen that the burnishing head 200 includes an air bearing surface 202 and burnishing pad 204 which are substantially the same distances, respectively, from the disc surface 182 as were the comparable elements shown in FIG. 5B. Thus, the burnishing head 200 can be expected to provide the same level of surface conditioning as the prior art burnishing head 192 of FIG. 5B was intended to provide.

Furthermore, even though FIG. 6 includes a liquid layer 184 on the disc surface 182 comparable to those of FIGS. 5A and 5B, there is no liquid meniscus formed between the burnishing pad 204 and the disc surface 182. This is because the burnishing pad 204 is surrounded by a moat, or trench, 206. The presence of the moat 206 results in the height 208 of the burnishing pad 204 being greatly increased. Since the size—and, therefore, the strength—of the liquid meniscus is inversely proportional to this height 208, the height 208 can be selected to eliminate the liquid meniscus present with the prior art burnishing heads of FIGS. 5A and 5B.

Another way of looking at the configuration of the burnishing head 200 is that the height 208 of the burnishing pad 204 has been decoupled from the dimension separating the air bearing surface 202 from the lowermost surface of the burnishing pad 204, and is only a function of the depth 210 of the moat 206 surrounding the burnishing pad 204. When the height 208 of the burnishing pad 204 is great enough, aerodynamic effects associated with the spinning disc and the burnishing pad 204 act to create a physical separation between the liquid layer 184 and the burnishing pad 204. Since there is no liquid meniscus formed between the burnishing pad 204 and the disc surface 182, stiction between these elements is reduced.

A second drawback of the prior art burnishing head 170 of FIGS. 4A–4C relates to consistent control of the effective burnishing height. Since the prior art burnishing head 170 is intended to fly above the disc surface, the flying height of the burnishing head 170—and, therefore, the separation between the burnishing pads and the disc surface which defines effective burnishing height—is a function of the hydrodynamic lifting force generated by the air bearing design of the slider and a counterbalancing load force applied to the burnishing head by the head suspension (140 in FIG. 2) used to mount and support the burnishing head. The hydrodynamic lifting force is, in turn, at least partially dependent on the relative linear velocity between the head and the portion of the rotating disc below the head assembly, a velocity which varies with the radius at which the burnishing head is engaged with the disc, unless compensating variation of the rotational speed of the disc is provided, as noted above. All of these variables combine to make it problematic to provide a precisely controlled, repeatable effective burnishing height using the prior art burnishing head.

A second aspect of the invention is to provide small spacers on some or all of the burnishing pads on the burnishing head. These spacer pads are intended to directly contact the surface of a disc being burnished, and thus provide a more closely controlled and repeatable effective burnishing height than was possible with the prior art burnishing head. That is, instead of balancing the hydrodynamic lifting force of the air bearing of the burnishing head against a load force provided by the head suspension to determine the effective burnishing height, the load force of the head suspension is sufficient to marginally overcome the hydrodynamic lifting force of the burnishing head and maintain the spacer pads on the burnishing pads in lightly loaded contact with the disc surface. Such a lightly loaded contact is simpler to achieve and maintain than is the delicate balance necessary with the true flying character of the prior art burnishing head.

In fabricating the spacer pads, a thin, wear-resistant material is deposited on specific burnishing pads, and is patterned into small spacers than can be tailored to satisfy specific customer-specified burnishing height requirements. Such spacer pads control, with great accuracy, the distance between the burnishing pads of the burnish head and the disc surface by remaining in direct contact with the disc surface during the burnishing process. The contact surface of the spacer pads can also be designed to maintain a predetermined degree of surface roughness over the lifetime of the burnishing head in order to minimize the stiction phenomenon.

FIGS. 7A, 7B and 7C are bottom plan view, side sectional elevation view and end sectional elevation views, respectively, of a burnishing head 210 made in accordance with the present invention, with the views of FIGS. 7B and 7C taken along lines III–III', respectively.

The burnishing head 210 includes an air bearing surface 212, which further includes a beveled portion 214 near the leading edge of the burnishing head 210.

The burnishing head 210 also includes an array of individual burnishing pads 216 arranged in a substantially elliptical array consisting of alternating, laterally extending rows of three and four burnishing pads 216 each, with the first and last rows including three burnishing pads 216. The overall elliptical shape of the burnishing pad array serves to minimize edge effects near the lateral and longitudinal extremes of the burnishing head 210. It can also be noted in the figure that the burnishing pads are located such that the lateral edges of the burnishing pads in any given row longitudinally overlap the lateral edges of rows ahead of and behind each row. Such an arrangement provides a burnishing head that has an effective burnishing width equal to the overall width of the burnishing pad array.

FIG. 7A shows the shape of the individual burnishing pads 216 as substantially elliptical also. While the generally elliptical shape of the burnishing pads 216 acts to facilitate airflow around and between the individual burnishing pads, other burnishing pad shapes, such as circular or oval, are also achievable using current manufacturing processes. For instance, the location and shape of the burnishing pads 216 are readily determined using the processes of photolithographic masking and ion milling. Therefore, the specific shape of the individual burnishing pads is not envisioned as being limiting to the scope of the present invention.

The figures also show the moats 218 surrounding the burnishing pads 216. As previously described with regard to FIG. 6, these moats 218 act to minimize or eliminate any liquid meniscus which might form between the burnishing pads 216 and a disc being burnished, and thus act to reduce stiction between the burnishing head 210 and the disc.

Analysis of the sectional views of FIGS. 7B and 7C reveals that the moats 218 are recessed from surrounding portions of the air bearing surfaces 212. As previously described, the depth of the moats 218 below the air bearing surface 212 is a separately controllable dimension independent of the height relationship between the air bearing surface 212 and the contact surface of the burnishing pads 216. Thus the height of the burnishing pads 216 from the greatest depth of the moats 218, i.e., the dimension which controls the formation, size and strength of an undesirable liquid meniscus, can be selected to control the formation of such a liquid meniscus without affecting the relationship between the air bearing surface 212 and the contact surface of the burnishing pads 216.

FIGS. 7A, 7B and 7C also show that a plurality of spacer pads 220 are provided near the trailing edges of selected ones of the array of burnishing pads 216. These spacer pads 220 extend from the contact surfaces of the burnishing pads 216 to a height which determines the burnishing characteristic of the entire burnishing head 210. That is, the spacer pads 220 are intended to directly contact the surface of the disc being burnished, and the height of the spacer pads 220 above the contact surface of the burnishing pads 216 thus determines the height to which surface defects will be burnished, as will be discussed in more detail below.

Figure 8:
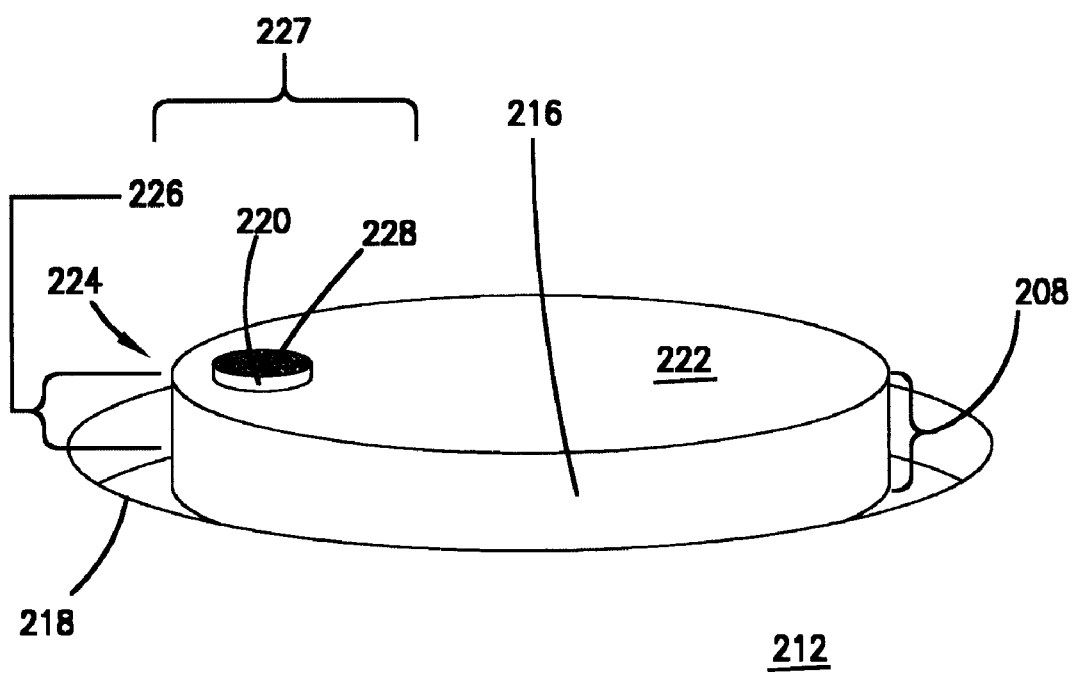
FIG. 8 is a perspective view of a single burnishing pad configured in accordance with the present invention.

FIG. 8 is a detail perspective view of an individual burnishing pad 216 which includes a spacer pad 220 extending from the contact surface 222 of the burnishing pad 216 near its trailing edge 224.

As previously described above, the burnishing pad 216 is surrounded by a moat 218, the depth of which below the surrounding air bearing surface 212 is selected to control the overall height 208 of the burnishing pad 216, and thus prevent the formation of an undesirable liquid meniscus between the burnishing pad 216 and a disc being processed. Once again it should be recalled that the presence of the moat 218 allows the overall height 208 of the burnishing pad 216 to be selected independent of the height separation 226 between the contact surface 222 of the burnishing pad 216 and the air bearing surface 212.

Using manufacturing processes such as photolithographic masking and ion milling allows the height relationships between all elements of the burnishing heads to be separately determined. That is, the height by which the spacer pad 220 extends beyond the contact surface 222 of the burnishing pad 216 can be selected independently from the overall height 208 of the burnishing pad 216, which is also independent of the height separation 226 between the contact surface 222 of the burnishing pad 216 and the air bearing surface 212, due to the presence of the moat 218 surrounding the burnishing pad 216.

The independently selectable height relationships provided by the present invention allow a burnishing head to be optimized for desired burnishing characteristics, without imposing detrimental effects inherent in prior art burnishing heads, such as that of FIGS. 4A, 4B and 4C. That is, the effective burnishing height of the burnishing head of the present invention is controlled by the height by which the spacer pad 220 extends from the contact surface 222 of the burnishing pad 216, since the contact surface 228 of the spacer pad 220 is intended to maintain direct contact with the surface of the disc being burnished. This effective burnishing height is also independently selectable from the overall height specification 208 of the burnishing pad 216—which can be selected to reduce stiction by eliminating the formation of a liquid meniscus between the burnishing pad 216 and the surface of a disc—and both these dimensions can be selected independent of the desired height separation between the contact surface 222 of the burnishing pad 216 and the air bearing surface 212. Thus, the burnishing, flying and stiction characteristics of the burnishing head of the present invention can be individually optimized without inextricably effecting the other characteristics.

In another aspect of the invention, since the contact surfaces 228 of the spacer pads 220 are intended to maintain direct contact with the surface of the disc being burnished, the tribological relationship between the contact surfaces 228 of the spacer pads and the disc surface is of concern. As was previously discussed above in regard to FIG. 3, if both the contact surface 228 of the spacer pads 220 and the disc surface are manufactured to atomic smoothnesses, an undesirable amount of stiction is generated. Therefore, the present invention envisions that the contact surface 228 of the spacer pads will be microtextured to reduce stiction.

Fabrication of the spacer pad 220 on the contact surface 222 of the burnishing pad 216 can be accomplished by several processes: as a first alternative, a photo mask, exposing and defining the desired location of the spacer pads 220, is applied to the surface of the slider body, and the spacer material is deposited (this operation can be performed either before or after the formation of the burnishing pads 216 by ion milling, since the contact surfaces 222 of the burnishing pads 216—including any included spacer pads 220—are protected during the ion milling process that defines the shape and location of the burnishing pads); the second alternative is to deposit a blanket layer of the spacer pad material, apply a mask protecting the desired locations of the spacer pads 220, and ion mill away the unwanted material.

Several material deposition processes readily lend themselves to the formation of the spacer pads, including vapor deposition, ion beam sputtering, direct ion beam deposition, RF sputtering, laser ablation and cathodic arc deposition.

The scope of the present invention also envisions several possible different materials for the slider body, including the air bearing surfaces, burnishing pads and spacer pads, which provide the necessary wear resistance characteristics. Among these suitable materials are tungsten carbide (WC), titanium nitrate (TiN), aluminum nitrate (AlN), aluminum oxide ($Al_2O_3$) and silicon carbide (SiC). The scope of the present invention also envisions that the wear coating applied to the spacer pads can be any of various forms of diamond-like coating (DLC), including amorphous hydrogenated or nitrogenated carbon and tetrahedrally bonded amorphous carbon. While the materials listed are believed to be particularly suitable for implementation of the invention, other materials having appropriate characteristics to provide the functionality to be described below may also be used. Therefore, it is not envisioned that the scope of the invention is limited to the particular materials listed herein as suitable.

In order to overcome the stiction problem caused by the interfacing of two extremely smooth surfaces, as explained hereinabove in the discussion of FIG. 3, the contact surface of the spacer pad 220 needs to exhibit a pre-determined and controlled roughness. The present invention envisions that this desired surface microtexturing will be achieved using the process of Interference Lithography (IL). IL requires that the contact surface of the spacer pads 220 be first coated with a suitable masking or photoresist material. Then two or more coherent light sources are used to expose the photoresist, creating an interference pattern which leaves a uniform sinusoidal pattern on the photoresist. When this resultant surface is etched, using, for instance ion milling, the contact surface of the spacer pad exhibits the same three-dimensional sinusoidal topography. When such a deterministic surface is formed on or coated with, for instance, a DLC, the resulting surface not only acts to reduce static friction, as noted above in the discussion of FIG. 3, but also forms a very durable surface suitable for the burnishing head of the present invention, due to reduction of contact stresses. The microtextured DLC coating also acts to prolong the lifetime of the burnishing head because it acts to reduce contact-induced wear during the burnishing process.

Figure 9A:
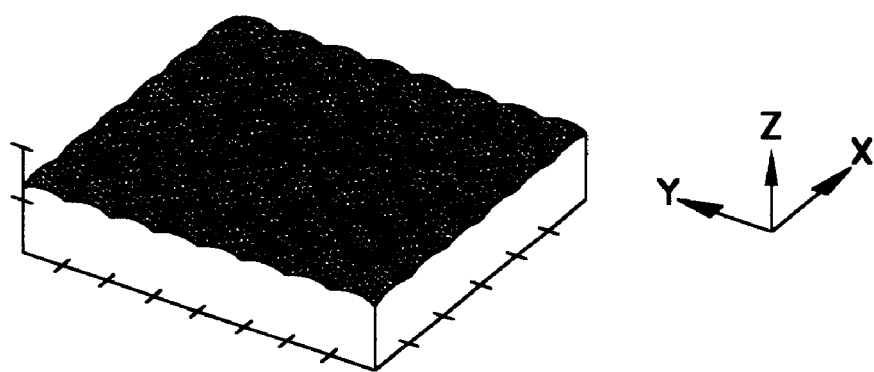
FIG. 9A is an extreme closeup view of a portion of the contact surface of a spacer pad, showing a microtexturing which forms a part of the burnishing head of the present invention.

FIG. 9A is an extreme close up view, exemplary of an Atomic Force Microscopy (AFM) analysis of such a microtextured surface, along with arrows defining the orthogonal axes employed in the ensuing discussion.

In FIG. 9A, units along the X- and Y-axes are 0.2 μm (micrometers)/division, while units in the Z-axis are 25 nm (nanometers)/division. As will be apparent to one of skill in the art, such a surface texture has a roughness parameter, σ/R, (as previously defined hereinabove) of substantially 0.0004. When this value is correlated to the graph of FIG. 3, it is also apparent that such a surface will act to minimize stiction between the burnishing head of the present invention and the surface of a disc being burnished.

Figure 9B:
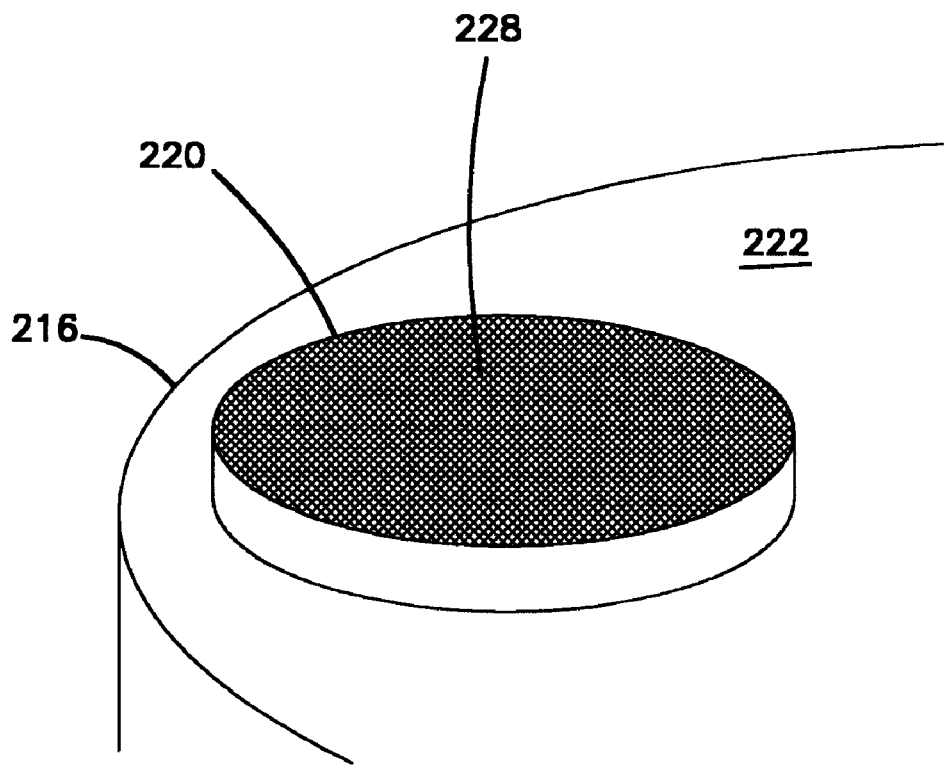
FIG. 9B is a detail perspective view of a spacer that forms a part of the burnishing head of the present invention.

FIG. 9B is a closeup partial perspective view of a spacer pad 220 extending from the contact surface 222 of a burnishing pad 216. The view of FIG. 9 corresponds to that portion of FIG. 8 generally designated with numerical reference 227 in FIG. 8, and shows the contact surface 228 of the spacer pad 220 microtextured as described.

It is also well known in the industry that the process of burnishing generates significant amounts of particulate contaminants as defects are mechanically removed from the disc surface. Burnishing with prior art burnishing heads, such as that of FIGS. 4A, 4B and 4C, provides no distinct mechanism for removal of such particulates, which can, in a completed disc drive, cause fatal interference between the operational head assemblies and the discs.

An additional benefit of the burnishing head of the present invention is that the moats 218 surrounding the burnishing pads 216 act as collection points for such generated particulates.

Figure 10A:
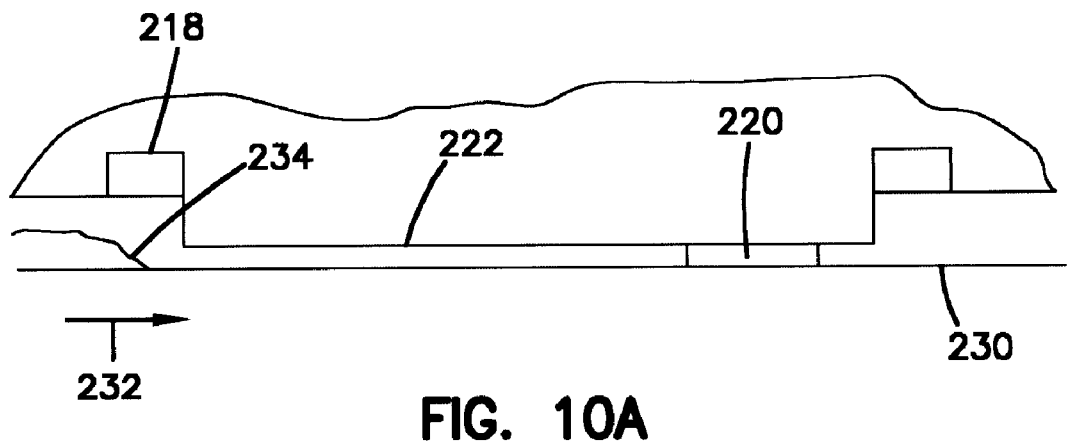
FIGS. 10A through 10C are detail side elevation sectional views showing successive steps in a burnishing process which employs the burnishing head of the present invention.
Figure 10B:
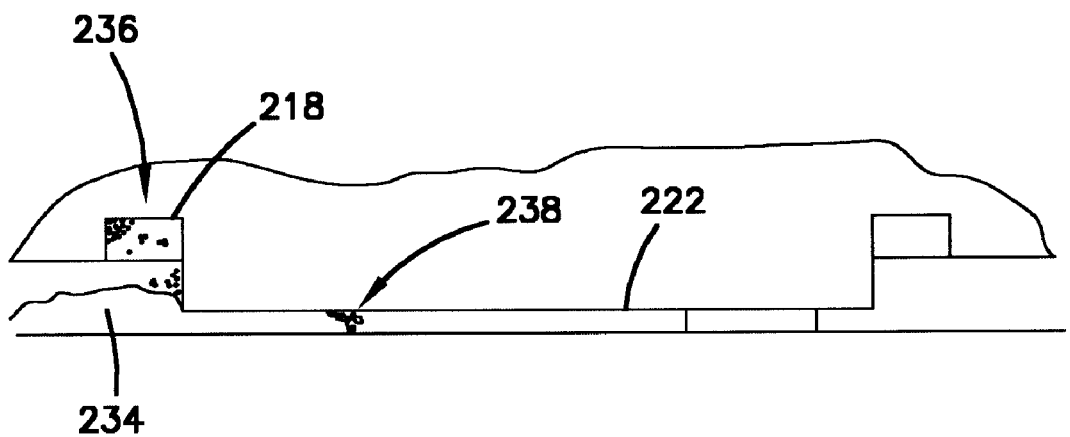
Figure 10C:
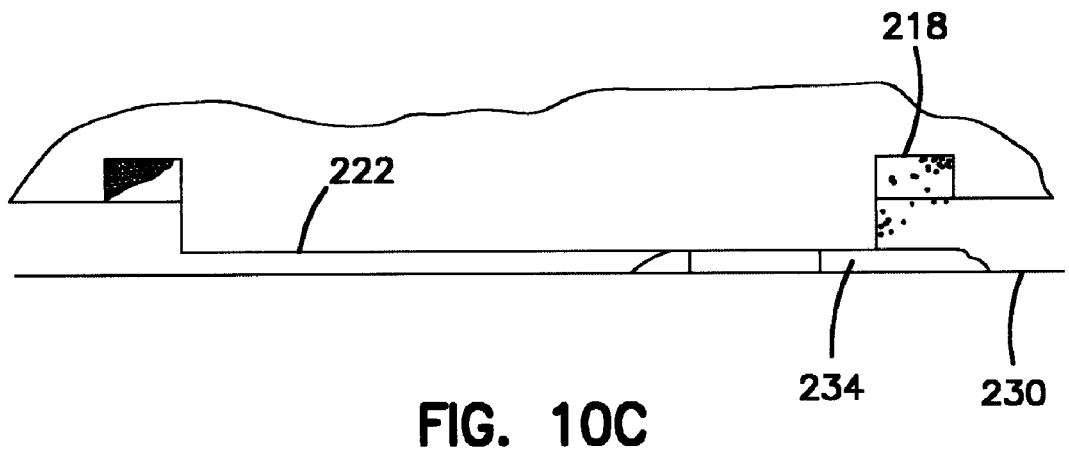

FIGS. 10A, 10B and 10C are detail side sectional elevation views of elements of a burnishing head made in accordance with the present invention, and show successive stages in the process of burnishing a single defect on the surface of a disc.

In the figures a single burnishing pad is shown with a spacer pad 220 extending from the contact surface 222 of the burnishing pad and into contact with the surface 230 of a disc. The direction of rotation of the disc relative to the burnishing head is shown by arrow 232 in FIG. 10A.

From the figures it is readily apparent that, since the spacer pad 220 is in direct contact with the disc surface 230, the effective burnishing height of the burnishing head is determined by the dimension by which the spacer pad extends beyond the contact surface 222 of the burnishing pad. Thus the burnishing precision of the burnishing head is a function of the precision with which the spacer pads 220 are fabricated, and current manufacturing technology allows fabrication of spacer pads that permit burnishing to previously noted desired precisions, i.e., less than a microinch.

FIG. 10A shows a surface defect 234 approaching the burnishing head from the left in the drawing. As the defect begins to pass beneath the burnishing pad, as shown in FIG. 10B, the burnishing pad acts to mechanically level the defect 234 to the desired height. This burnishing process causes particulates to be generated as shown generally at 236 and 238. When it is recalled that the moat 218 completely surrounds the burnishing pad, it is evident that such particulates will be readily accumulated within the moat 218 at or near the leading edge of the burnishing pad. Any particulates, such as those shown at 238, which are generated and remain below the contact surface 222 of the burnishing pad, are readily swept up away from the discs surface 230 and into the moat 218 at the trailing edge of the burnishing pad when the burnished defect 234 exits from beneath the burnishing pad, as shown in FIG. 10C.

Thus, the moat 218 surrounding the burnishing pads of the burnishing head of the present invention not only acts to reduce stiction, as previously described, but also serves to collect and accumulate particulates generated by the burnishing process, minimizing the possibility that such particulates will later be a potential source of problems in the finished disc drive.

FIGS. 11 through 18 are simplified detailed side sectional elevation views illustrating steps in an example manufacturing process which can be used to fabricate the burnishing head of the present invention. It should be noted that, during the ensuing discussion of the figures, the description of the manufacturing steps is a general discussion, and assumes detailed knowledge of manufacturing processes on the part of the reader. For instance, several of the fabrication steps to be discussed include references to "forming a protective mask". The discussion does not detail the sub-steps, materials and particular processes involved in "forming a protective mask", since such information will be well known to those of experience in the art.

Furthermore, the reader will note that alternative sequences of steps are offered at various points in the fabrication process under discussion. Therefore, the particular sequence of manufacturing steps set forth below should be considered as exemplary only, and the scope of the invention is not envisioned to be limited by the particular sequence in which the various elements of the burnishing head of the present invention are formed.

Figure 11:
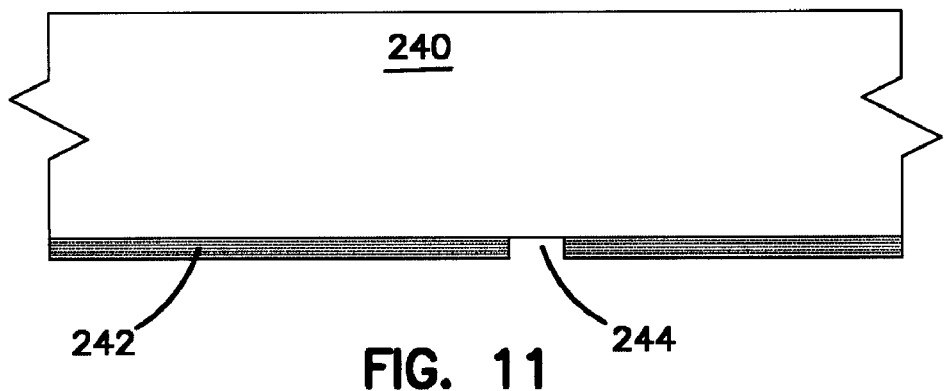
FIGS. 11 through 18 are detail sectional elevation views showing steps in a process for fabricating the burnishing head of the present invention.

FIG. 11 shows a detail side elevation sectional view of a portion of a prepared slider body 240, and assumes as prior art the fabrication sequence required to form the prepared slider body. The process steps described below will explain the fabrication sequence necessary to form one burnishing pad with an associated spacer pad. One of skill in the art will recognize that the multiple burnishing pads of the disclosed burnishing pad array, both those with and those without associated spacer pads, would be formed simultaneously, and the discussion is limited to fabrication of a single burnishing pad for purposes of clarity only.

As shown in FIG. 11, the first step in fabricating the burnishing head of the present invention is forming a first protective mask 242 on the side of the slider body 240 intended to include the burnishing pads. This first protective mask 242 includes openings 244 at the intended eventual locations of the spacer pads.

Figure 12:
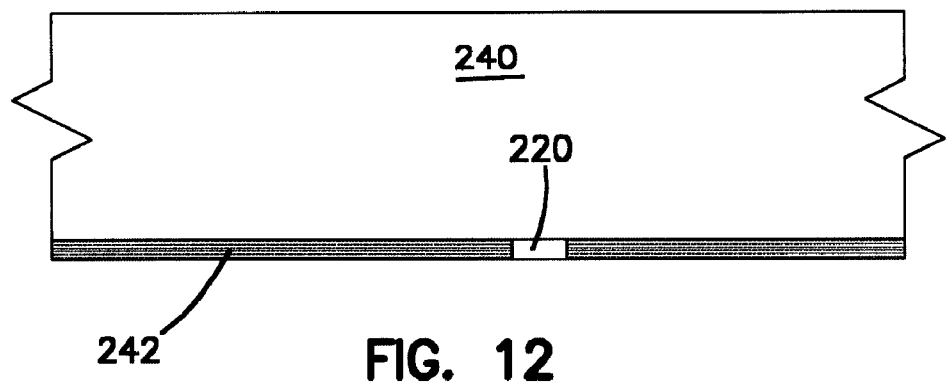

As shown in FIG. 12, the second fabrication step is the deposition of the spacer pads 220 on the slider body 240 at the locations not covered by the first protective mask 242. It should be recalled that the material of the spacer pads 220 is selected for wear resistance, and can be any of the example materials previously noted or other material having the desired characteristics. Similarly, the specific process used to deposit the spacer pad material can be any of the previously noted material deposition techniques.

Figure 13:
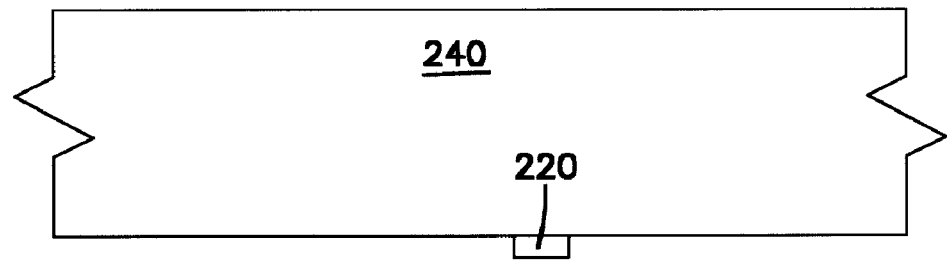

In a third step, as shown in FIG. 13, the first protective mask 242 is stripped away, leaving the slider body 240 with the desired spacer pads 220 integrally attached thereto. One of skill in the art will appreciate that the size, shape and location of the spacer pads 220 will be determined by the configuration of the first protective mask (242 in FIGS. 11 and 12). Similarly, one of skill in the art will realize that the spacer pads 220 can also be formed by depositing the spacer pad material over the entire lower surface of the slider body 240, applying an alternative first protective mask that protects only the desired locations of the spacer pads 220, and removing the undesired portion of the previously deposited layer of spacer pad material, using, for instance, ion milling. Whichever sequence of steps is performed, the resultant structure is that shown in FIG. 13. That is, a slider body 240 with spacer pads 220 of the desired size, shape and location.

Figure 14:
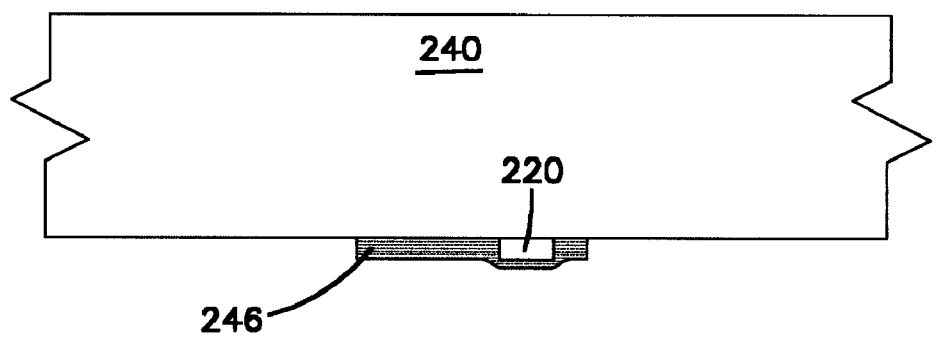

Step four in the manufacturing process is illustrated in FIG. 14, which shows a second protective mask 246 deposited on the slider body 240. This second protective mask 246 defines the desired size, shape and location of the burnishing pads. As shown in FIG. 14, on those burnishing pads associated with spacer pads 220, the second protective mask also covers the spacer pads 220.

Figure 15:
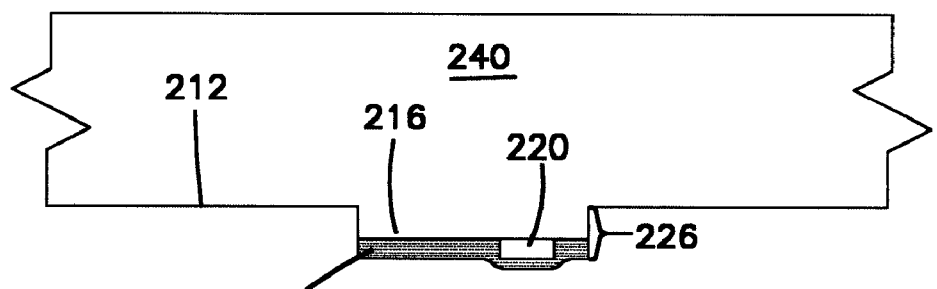

FIG. 15 shows step five in the fabrication process, in which, those areas of the slider body 240 not covered by the second protective mask 246 are ion milled to form the air bearing surface 212 of the burnishing head, and to cause the burnishing pads 216, with any associated spacer pads 220, to extend from the air bearing surface 212 by a desired height 226 (also similarly designated in FIG. 8).

Figure 16:
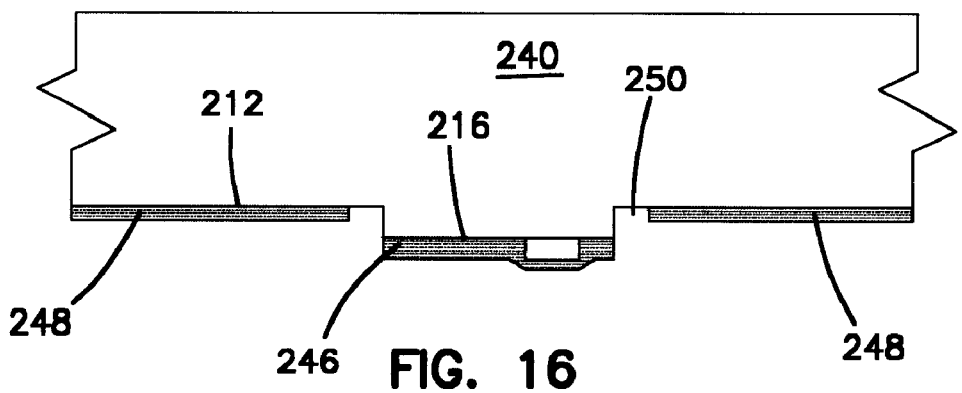

The sixth fabrication step is shown in FIG. 16, and involves the formation of a third protective mask 248 on the air bearing surface 212 formed in step five (FIG. 15). It should be noted in FIG. 16 that the second protective mask 246 is still in place, protecting the burnishing pads 216, and any associated spacer pads 220.

The third protective mask 248 covers the air bearing surface 212 except where openings 250 are provided surrounding the burnishing pads 216.

Figure 17:
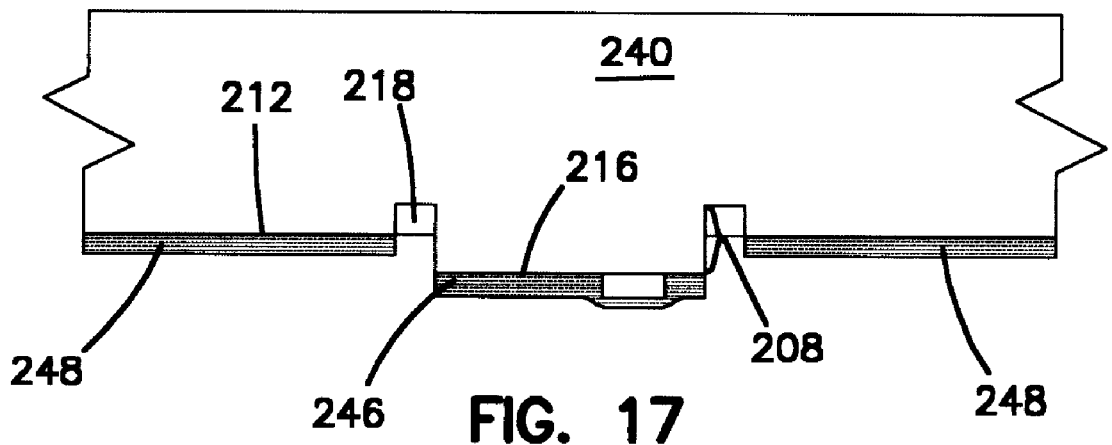

The seventh fabrication step is illustrated in FIG. 17, in which those portions of the slider body 240 not protected by the second and third protective masks 246, 248, are subjected to a second ion milling operation to form the moats 218 surrounding the burnishing pads 216. This second ion milling operation also serves to define the depth of the moats 218, and, in turn, the overall height 208 (similarly designated in FIG. 8) of the burnishing pads 216. It will be recalled that this overall height 208 is selected to minimize or eliminate the formation of a liquid meniscus between the burnishing pads 216 and the disc, as previously discussed with regard to FIGS. 5A, 5B and 6 above.

Figure 18:
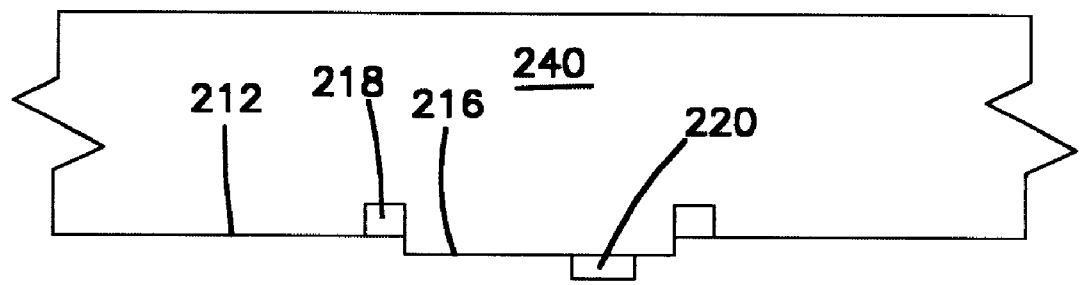

In a final manufacturing step, as illustrated in FIG. 18, the second and third protective masks 246, 248 are stripped away, leaving the completed burnishing head structure, including the air bearing surface 212, burnishing pads 216 with surrounding moats 218 and any associated spacer pads 220.

It should also be noted that, if microtexturing of the contact surface of the spacer pads 220 is to be included in the finished burnishing head, the microtexturing can be provided at any one of several stages in the manufacturing process. For instance, in the sequence described above, proper masking of the contact surface of the spacer pads 220, interference lithographic treatment of the mask and etching of the contact surface can be accomplished between step 2 (FIG. 12), in which the material of the spacer pads 220 is deposited on the slider body 240, and step 3 (FIG. 13), in which the first protective mask 244, defining the size, shape and location of the spacer pads 220, is stripped away.

If the noted alternative fabrication process for forming the spacer pads 220 is used, then microtexturing of the entire deposited layer of spacer pad material can be accomplished before the undesired portion of the spacer pad material is removed to form the spacer pads 220. If the microtexturing of the contact surface of the spacer pads 220 is performed in either of these manners, then the second protective mask applied in step four (FIG. 14) will serve to protect and maintain the microtextured surface during subsequent fabrication steps.

Alternatively, after the final step of FIG. 18 is accomplished, an appropriate masking and interference lithographic process can be used to microtexture the contact surfaces of the spacer pads 220 as a final manufacturing step.

In summary, the burnishing head of the present invention includes an air bearing surface that further includes a substantially elliptical array of burnishing pads extending from the air bearing surface toward the disc being burnished. In a first aspect of the invention, selected ones of the burnishing pads include spacer pads which extend from contact surfaces of the burnishing pads, and a load force is exerted by the head suspension used to mount and support the burnishing head. The load force is selected to be large enough to overcome the hydrodynamic lifting tendency of the air bearing surface and maintain the spacer pads in lightly loaded contact with the disc surface, with the height of the spacer pads above the contact surfaces of the burnishing pads thus serving to define the effective burnishing height of the burnishing head. In a second aspect of the invention, each of the burnishing pads is surrounded by a moat, with the depth of the moat selected to control the overall height of the burnishing pad in relationship to the disc surface in order to minimize or eliminate formation of a liquid meniscus between the burnishing pads and the disc surface, and thus reduce stiction. In a third aspect of the invention, the moats surrounding the burnishing pads act as collection features to accumulate particulates generated by the burnishing process. In a final aspect of the invention, the contact surfaces of the spacer pads are microtextured to optimize the tribological relationship between the burnishing head and the disc, and to further minimize stiction.

From the foregoing, it is apparent that the present invention is particularly well suited to provide the benefits set forth hereinabove as well as others inherent therein. While particular embodiments of the invention have been described herein, modifications to the embodiments that fall within the envisioned scope of the invention may suggest themselves to one of skill in the art who reads this disclosure. Therefore, the scope of the invention should be considered to be limited only by the following claims.

What is claimed is:

1. A burnishing head for smoothing surface irregularities on the surface of a magnetic recording disc comprising:

a slider body comprising an air bearing surface;

an array of burnishing pads extending by a first height beyond the air bearing surface;

a plurality of spacer pads extending by a second height from selected ones of the burnishing pads,
the spacer pads having contact surfaces intended to directly contact a disc being burnished;

whereby the second height defines an effective burnishing height of the burnishing head.

2. A burnishing head as claimed in claim 1, wherein the contact surfaces of the spacer pads are microtextured.

3. A burnishing head as claimed in claim 1, also comprising:

moats surrounding each of the burnishing pads.

4. A burnishing head as claimed in claim 3, wherein the contact surfaces of the spacer pads are microtextured.

5. A burnishing head as claimed in claim 1, wherein the contact surfaces of the spacer pads include a diamond-like coating thereon.

6. A burnishing head as claimed in claim 5, wherein the contact surfaces of the spacer pads are microtextured.

7. A burnishing head as claimed in claim 5, and further comprising:

moats surrounding each of the burnishing pads.

8. A burnishing head as claimed in claim 7, wherein the contact surfaces of the spacer pads are microtextured.

9. A burnishing head as claimed in claim 1, wherein the effective burnishing height is less than one microinch.

10. A burnishing head as claimed in claim 9, wherein the contact surfaces of the spacer pads are microtextured.

11. A burnishing head as claimed in claim 9, further comprising: moats surrounding each of the burnishing pads.

12. A burnishing head as claimed in claim 11, wherein the contact surfaces of the spacer pads are microtextured.

13. A burnishing head as claimed in claim 9, wherein the contact surfaces of the spacer pads include a diamond-like coating thereon.

14. A burnishing head as claimed in claim 13, wherein the contact surfaces of the spacer pads are microtextured.

15. A burnishing head as claimed in claim 13, further comprising: moats surrounding each of the burnishing pads.

16. A burnishing head as claimed in claim 15, wherein the contact surfaces of the spacer pads are microtextured.

17. A burnishing head for smoothing surface irregularities on the surface of a magnetic recording disc comprising:

a slider body comprising an air bearing surface;

an array of burnishing pads extending by a first height beyond the air bearing surface;

a plurality of spacer pads extending by a second height from selected ones of the burnishing pads, the spacer pads having contact surfaces intended to directly contact a disc being burnished;

the contact surfaces being microtextured and including a diamond-like coating thereon; and moats surrounding each of the burnishing pads, whereby the second height defines an effective burnishing height of the burnishing head.

18. A burnishing head for smoothing surface irregularities on the surface of a magnetic recording disc comprising:

a slider body comprising an air bearing surface;

an array of burnishing pads extending by a first height beyond the air bearing surface; and first means for establishing an effective burnishing height for the burnishing head.

19. A burnishing head as claimed in claim 18, further comprising:

second means for optimizing the friction and wear characteristics between the burnishing head and the disc.

20. A burnishing head as claimed in claim 18, further comprising:

second means for accumulating generated particulate contaminants.

* * * * *

UNITED STATES PATENT AND TRADEMARK OFFICE
CERTIFICATE OF CORRECTION

PATENT NO. : 6,296,552 B1  
DATED : October 2, 2001  
INVENTOR(S) : Boutaghou et al.

Page 1 of 1

It is certified that error appears in the above-identified patent and that said Letters Patent is hereby corrected as shown below:

<u>Column 10,</u>  
Line 27, after "lines" insert -- II-II' and --.

Signed and Sealed this

Twenty-first Day of May, 2002

*Attest:*

*Attesting Officer*

JAMES E. ROGAN  
*Director of the United States Patent and Trademark Office*